United States Patent Office 3,271,348
Patented Sept. 6, 1966

3,271,348
FUSED EPOXY RESIN-MONOAMINE COMPOUND AS PROCESSING AID IN PIGMENTED NYLON
Augustinus Ludovicus Henricus Hartong, Deventer, Netherlands, assignor to American Enka Corporation, Enka, N.C., a corporation of Delaware
No Drawing. Filed Jan. 17, 1962, Ser. No. 166,914
Claims priority, application Netherlands, Feb. 3, 1961, 260,804
3 Claims. (Cl. 260—32.6)

This invention relates to the production of pigmented, synthetic linear polyamides and more particularly to a process for pigmenting synthetic linear polyamides, including the compositions used in such process and the products produced thereby.

Processes for preparing pigmented synthetic, linear polyamides are known in which the polyamides are mixed with a suspension of a pigment. One disadvantages of these processes is that the pigment suspensions are generally unstable. As a result, the pigmented polyamide products obtained thereby do not have a homogeneous color. It is known that stable pigment suspensions can be obtained by mixing the pigment with a silicone, for instance, a methylsilicone oil. Such pigment suspensions can then be mixed with a polyamide and products can be obtained by usual methods, for instance, by injection molding. Although the presence of silicones permits easier removal of the shaped articles from the mold than when other dispersing agents are used, for instance, polyesters or polyester amides, the effect obtained is still not what it should be, since the shaped articles still have a tendency to adhere to the mold. This is especially true with polyamides prepared from ε-caprolactam where temperatures between 45° C. and 60° C. are used in the injection mold.

Accordingly, it is an object of this invention to provide a process and composition for the production of pigmented polyamides that have a homogeneous color.

Another object of this invention is to provide a process and composition for producing pigmented polyamides in which the shaped articles do not stick to the injection mold.

Still another object of this invention is to provide a stable pigment suspension for pigmenting polyamides.

These and other objects will become apparent from the following detailed description.

In accordance with this invention, pigmented polyamides are obtained using a pigment suspension comprising a mixture of a pigment, an aliphatic monoamine containing at least 14 carbon atoms, and an epoxy resin such as that produced from the reaction of epichlorohydrin with diphenylol propane. Such pigment suspensions are very stable and also have the advantage that a mixture of such suspension and a polyamide, particularly poly-ε-caprolactam, can readily be processed by means of injection molding machines without the shaped articles showing any tendency to adhere to the wall of the mold, even at temperatures between 45° C. and 60° C.

Both organic and inorganic pigments may be used, particularly those which are not affected by contact with melted polyamides. Examples of these are: titanium dioxide, carbon black, copper phthalocyanin, lead chromate, iron oxide, and chromium oxide. The amount of pigment in the suspension may vary within wide limits, depending on the type of pigment used and the type and amount of amine and epoxy resin mixed therewith. For example, if an epoxy resin having a high molecular weight is used, it is possible for the suspension to contain a relatively high amount of pigment without any risk of the pigment settling in the suspension.

The amine can be any primary, secondary, or tertiary aliphatic monoamine having at least 14 carbon atoms. Examples of specific amines that can be used in this invention are tetradecylamine, hexadecylamine, octadecylamine, docosylamine, tetracosylamine, diheptylamine, dioctylamine, didodecylamine, dioctadecylamine, decyldimethylamine, dodecyldimethylamine, and octadecyldimethylamine. In principle, all these amines, including mixtures thereof, may be used. For economy, however, it is preferred to use octadecylamine. As previously mentioned, aliphatic monoamines must be used that contain at least 14 carbon atoms. It has been found that while aliphatic monoamines containing fewer than 14 carbon atoms may have more satisfactory pigment suspending properties than aliphatic monoamines containing 14 carbon atoms or more, they have a disadvantage in that polyamide articles containing such amines that have been processed by injection molding cannot be released very well from the wall of the mold. The composition of the pigment suspension and the amount thereof to be added to the polyamide must be chosen so that the amount of amine present in admixture with the polyamide is not more than 5% by weight, based on the amount by weight of polyamide. If the percentage is higher than 5% by weight the properties of the polyamides may be unfavorably affected.

The amount of epoxy resin present in the pigment suspension may vary within wide limits depending on the molecular weight of the epoxy resin. Obviously, the higher the molecular weight of the epoxy resin the lower the amount of epoxy resin that may be present in the pigment suspension. The molecular weight of the epoxy resins used may likewise vary over a wide range. For instance, use may be made of epoxy resins having a molecular weight of about 300. It is preferred, however, to use epoxy resins having a higher molecular weight. For example, epoxy resins having a molecular weight of 3,800 are quite satisfactory. Epoxy resins having a molecular weight higher than 3,800 may also be used.

The addition of the pigment suspension to the polyamide may be effected in various ways. For instance, polyamide granules may be mixed with the pigment suspension or the pigment suspension may be mixed with a certain amount of melted polyamide. Since the pigment suspensions are somewhat viscous, they are particularly suitable for injection methods. This can be accomplished by means of a pump, for instance, a gear pump, with the suspension being injected into melted polyamide as it leaves the reaction vessel in which it is prepared.

A further understanding of this invention will be apparent from the following specific example which is intended to illustrate the present invention, but not to limit the scope thereof.

*Example*

Seven different pigment suspensions were prepared under the following conditions. The amine and epoxy resin together were pulverized in a mill and the resulting powder mixed with a pigment. The pigmented powder was then melted at about 110° C. with stirring to produce a pigment dispersion. This was stored at 90° C. For comparison purposes, an additional pigment suspension was prepared using methylsilicone as the dispersing agent. The specific composition of these eight suspensions are set forth in the table below. All pigment suspensions were stable at 90° C.

TABLE

| | Amine | Parts by weight | Resin | Molecular Weight | Parts by weight | Pigment | Parts by weight |
|---|---|---|---|---|---|---|---|
| 1 | Tetradecylamine | 450 | Epikote resin 562* | 300 | 300 | Cadmium red | 300 |
| 2 | ----do---- | 450 | Epikote resin 1004* | 1,400 | 300 | ----do---- | 300 |
| 3 | Octadecylamine | 450 | Epikote resin 1009* | 3,800 | 300 | ----do---- | 300 |
| 4 | Tetracosylamine | 450 | ----do---- | 3,800 | 200 | ----do---- | 300 |
| 5 | Diheptylamine | 450 | Epikote resin 562* | 300 | 300 | Titanium dioxide | 300 |
| 6 | Dioctadecylamine | 450 | Epikote resin 1009* | 3,800 | 300 | Ultra marine blue | 300 |
| 7 | Dimethylhexyldecylamine | 450 | Epikote resin 562* | 300 | 300 | Copperphthalocyanin | 300 |
| 8 | | | Methylsilicon oil | | 300 | Titanium dioxide | 300 |

*Epikote is a registered tradename for epoxy resins prepared from epichlorohydrin and diphenylol propane.

The pigment suspensions were each mixed with separate portions of polyamide melt prepared from ε-caprolactam, in proportions such that the separate portions of polyamide contained 0.5% by weight of the pigment. The individual portions of polyamide were spun into monofilaments and chipped into granules. The granules were then washed to reduce their content of low molecular constituents to about 2% by weight and dried. Subsequently, they were processed into combs by means of an automatic injection molding machine. The combs showed a homogeneous color.

With pigment suspensions Nos. 1 to 7, inclusive, combs could be made in unlimited series without adhering to the walls of the mold. The molding cycle was 11.5 seconds, i.e., every 11.5 seconds a comb was automatically ejected from the machine. With pigment suspension No. 8 the molding cycle had to be set at 45 seconds in order for the combs to be made in unlimited series.

As can be seen from the above, only if the pigments are suspended in mixtures of the amines and epoxy resins in accordance with this invention is it possible to obtain stable pigment suspensions which, if mixed with polyamides, give colored polyamides that can be processed in an injection molding machine, using a molding cycle of very short duration.

While various modifications and alternatives have been discussed hereinabove, for purposes of description and explanation, it is understood that the scope of this invention is limited only to the extent set forth in the following claims.

What is claimed is:

1. A process for uniformly incorporating pigments in polycaprolactam comprising forming a dispersion of finely divided pigment particles in a fused mixture of a compound or a mixture of compounds selected from the group of saturated primary, secondary and tertiary aliphatic monoamines having at least 14 carbon atoms and an epoxy resin having a molecular weight of from 300 to 3800 prepared by reacting epichlorohydrin with diphenylol propane in proportion of 2 to 3 parts of the epoxy resin per 4.5 parts of amine, and adding and mixing the resulting pigmenting dispersion to a polycaprolactam melt in amounts such that no more than 5% by weight of said amine based on the weight of polycaprolactam is included in said melt.

2. The process of claim 1 wherein the pigment is a member selected from the group consisting of titanium dioxide, carbon black, copper thiocyanaline, lead chromate, iron oxide, chromium oxide, cadmium red, and ultra marine blue.

3. The process of claim 1 in which the amine is octadecylamine.

References Cited by the Examiner

UNITED STATES PATENTS 2,345,533  3/1944  Graves.
2,846,332  8/1958  Nesty.
2,915,485  12/1959  Shokal.

FOREIGN PATENTS 528,791  8/1956  Canada.

OTHER REFERENCES

Lee et al., "Epoxy Resins," McGraw-Hill, 1957, p. 15.

MORRIS LIEBMAN, *Primary Examiner.*

MILTON STERMAN, ALEXANDER H. BRODMERKEL, *Examiners.*

A. KOECKERT, *Assistant Examiner.*